United States Patent
Healy et al.

(10) Patent No.: US 10,033,993 B2
(45) Date of Patent: *Jul. 24, 2018

(54) SYSTEM FOR DELIVERING STEREOSCOPIC IMAGES

(71) Applicant: Dolby Laboratories Licensing Corporation, San Francisco, CA (US)

(72) Inventors: Andrew Healy, San Francisco, CA (US); Thao D. Hovanky, San Francisco, CA (US); John Gilbert, Pacifica, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/239,922

(22) Filed: Aug. 18, 2016

(65) Prior Publication Data

US 2016/0360190 A1 Dec. 8, 2016

Related U.S. Application Data

(63) Continuation of application No. 13/865,441, filed on Apr. 18, 2013, now Pat. No. 9,445,083.

(Continued)

(51) Int. Cl.
*H04N 13/00* (2018.01)
*H04N 13/04* (2006.01)
(Continued)

(52) U.S. Cl.
CPC ....... *H04N 13/047* (2013.01); *G02B 27/0093* (2013.01); *G02B 27/225* (2013.01);
(Continued)

(58) Field of Classification Search
CPC ... G02B 27/225; H04N 13/0486; H04N 13/04
(Continued)

(56) References Cited

U.S. PATENT DOCUMENTS

| 5,430,474 A | 7/1995 | Hines |
| 5,614,941 A | 3/1997 | Hines |

(Continued)

FOREIGN PATENT DOCUMENTS

| EP | 1816510 | 8/2007 |
| WO | 2010/150174 | 12/2010 |

OTHER PUBLICATIONS

Chao-Hsu Tsai, et al. "Flat Panel Autostereoscopic Display" Proceedings of the SPIE—The International Society for Optical Engineering, vol. 4297, pp. 165-174, published in 2001.

(Continued)

*Primary Examiner* — Michael Teitelbaum
*Assistant Examiner* — Jean W Desir

(57) ABSTRACT

A system 8 for delivering stereoscopic images for viewing without 3-D glasses being required comprises a video display element 1, an image direction element 4, a front holder element 5, a rear holder element 3, and a resolution enhancement element 2. The video display element 1 outputs a plurality of left-eye images and a plurality of right-eye images. The image direction element 4 directs each left-eye image at a desired left-eye angle and directs each right-eye image at a desired right-eye angle. The front holder element 5 is movable relative to the rear holder element 3 to move the image direction element 4 to adjust each left-eye angle at which each left-eye image is directed and to adjust each right-eye angle at which each right-eye image is directed to suit each viewer. The resolution enhancement element 2 is modulated simultaneously with the image direction element 4.

21 Claims, 9 Drawing Sheets

Related U.S. Application Data

(60) Provisional application No. 61/636,023, filed on Apr. 20, 2012.

(51) Int. Cl.
    *G02B 27/22* (2018.01)
    *G02B 27/00* (2006.01)

(52) U.S. Cl.
    CPC ..... *G02B 27/2214* (2013.01); *H04N 13/0413* (2013.01); *H04N 13/0486* (2013.01)

(58) Field of Classification Search
    USPC ................ 348/51, 42; 349/15; 359/462, 458
    See application file for complete search history.

(56) References Cited

U.S. PATENT DOCUMENTS

| | | |
|---|---|---|
| 5,710,666 A | 1/1998 | McDonald |
| 6,377,295 B1 | 4/2002 | Woodgate |
| 6,825,985 B2 | 11/2004 | Brown |
| 6,833,960 B1 | 12/2004 | Scarbrough |
| 7,210,257 B2 | 5/2007 | McKinley |
| 7,298,552 B2 | 11/2007 | Redert |
| 7,457,038 B2 | 11/2008 | Dolgoff |
| 7,474,465 B2 | 1/2009 | Kalyanasundaran |
| 7,586,681 B2 | 9/2009 | Cernasov |
| 7,609,451 B1 | 10/2009 | Scarbrough |
| 7,738,175 B2 | 6/2010 | Steenblik |
| 7,971,377 B2 | 7/2011 | Zheng |
| 2002/0075566 A1 | 6/2002 | Tutt |
| 2007/0018585 A1 | 1/2007 | Ijzerman |
| 2011/0063575 A1 | 3/2011 | Nelson |
| 2011/0157336 A1 | 6/2011 | Bennett |
| 2011/0157338 A1* | 6/2011 | Chang .............................. 348/59 |
| 2011/0211256 A1 | 9/2011 | Connor |
| 2012/0154463 A1* | 6/2012 | Hur et al. ...................... 345/691 |
| 2012/0250151 A1* | 10/2012 | Lee ..................... G02B 27/2214 359/463 |

OTHER PUBLICATIONS

Harman, Philip V. "Retroreflective Screens and Their Application to Autostereoscopic Displays" Proceedings of SPIE—The International Society for Optical Engineering, 1997, pp. 145-153.

Lee, Yun-Gu et al. "Reduction of the Distortion Due to Non-Ideal Lens Alignment in Lenticular 3D Displays" Proceedings of SPIE-IS and T Electronic Imaging—Stereoscopic Displays and Virtual Reality Systems XII, 2005, pp. 506-516.

Omura, K. et al. "Lenticular Autostereoscopic Display System: Multiple Images for Multiple Viewers" Journal of the Society for Information Display 1998, pp. 313-324.

Surman, P. et al. "Multi-User 3D Display Employing Coaxial Optics" Proc. SPIE 5821, Current Research on Image Processing for 3D Information Displays, 163, Mar. 8, 2005, pp. 163-174.

Van Berkel, C. et al. "Multiview 3D-LCD" Proceedings of the SPIE—The International Society for Optical Engineering, vol. 2653, pp. 32-39, conference title: Stereoscopic Displays and Virtual Reality Systems III, Apr. 10, 1996.

* cited by examiner

SYSTEM FOR DELIVERING STEREOSCOPIC IMAGES

CROSS REFERENCE TO RELATED APPLICATIONS

This Application is a continuation application of U.S. patent application Ser. No. 13/864,441 filed on Apr. 18, 2013, which claims the benefit of priority of U.S. Provisional Patent Application No. 61/636,023 filed on 20 Apr. 2012 entitled "A System for Delivering Stereoscopic Images" by Andrew Healy et. al., hereby incorporated by reference in its entirety

INTRODUCTION

This invention relates to a system for delivering stereoscopic images.

STATEMENTS OF INVENTION

According to the invention there is provided a system for delivering stereoscopic images comprising:

means to direct a first left-eye image at a desired first left-eye angle and to direct a first right-eye image at a desired first right-eye angle, the direction means being movable to adjust the first left-eye angle at which the first left-eye image is directed and to adjust the first right-eye angle at which the first right-eye image is directed to suit a viewer.

The invention enables stereoscopic images to be viewed by a viewer without requiring the viewer to use additional equipment such as three-dimensional (3D) glasses.

The direction means controls the passage of light therethrough at the desired angles. By directing the images at the specific angles it is possible for a viewer to view the stereoscopic images with full 3D effect.

The direction means is movable to adjust the angles at which light passes therethrough. By adjusting the angles at which the images are directed, the system may be tailored to the exact requirements of a viewer, for example in the event that a viewer moves position the stereoscopic images may still be viewed with full 3D effect, or in the event that a first viewer is replaced by a second viewer the stereoscopic images may then be viewed by the second viewer with full 3D effect.

In one embodiment of the invention the direction means is of a flexible material. The flexibility of the material minimises the displacement required to create the desired 3D effects. By minimising the amount of displacement, the energy required by a prime mover to move the flexible material is minimised. The energy required to displace the flexible material is directly proportional to the square of the displacement of the flexible material. In particular the energy required to displace the flexible material may be calculated from the following equation:

$$K.E.=\tfrac{1}{2}*(K*X^2)$$

where K.E.=the required kinetic energy,
K=the spring constant of the flexible material,
X=the actual displacement of the flexible material.

Preferably the direction means comprises a film. The film allows flexibility, and is durable, and results in a low power requirement to move the film.

Minimising movement of the flexible film is advantageous in that the invention requires a minimum amount of displacement and thus provides a more durable arrangement.

Ideally the direction means comprises a plurality of first layer parts and a plurality of second layer parts coupled together. Most preferably the plurality of first layer parts are coupled to the plurality of second layer parts in an alternating manner. Each first layer part may be transparent. Each second layer part may be non-transparent. In this manner the direction means controls the passage of light therethrough at the desired angles by facilitating the passage of light through the transparent first layer parts and occluding the passage of light through the non-transparent second layer parts.

In another embodiment the direction means comprises one or more micro lenses. Micro lenses facilitate increased 3D image resolution and controllability.

In one case the direction means comprises one or more liquid crystal cells. The liquid crystal cells facilitate pixel-level control of a display while providing an ideal condition for damping of the flexible screen material. Having an interface with liquid crystal cells enables ideal mechanical damping for starting and stopping movement of the direction means.

In another case the system comprises means to hold the direction means. Preferably the holding means comprises a first holder element to hold a first side of the direction means and a second holder element to hold a second side of the direction means. Ideally the first holder element is movable relative to the second holder element to move the direction means. Most preferably the holding means is transparent.

In one embodiment the system comprises means to determine the location of a viewer. Preferably the direction means is configured to move responsive to the location determining means determining the location of a viewer. In this manner the system may be tailored to the exact location of a viewer. Ideally the location determining means comprises one or more head and/or eye tracking elements.

In another embodiment the system comprises means to output at least the first left-eye image and at least the first right-eye image. Preferably the output means is configured to output a plurality of left-eye images and a plurality of right-eye images. In this manner stereoscopic images may be viewed by a plurality of viewers. Ideally the direction means is configured to direct each left-eye image at a desired left-eye angle and to direct each right-eye image at a desired right-eye angle. Most preferably the direction means is movable to adjust each left-eye angle at which each left-eye image is directed and to adjust each right-eye angle at which each right-eye image is directed to suit a plurality of viewers. The output means may comprise a video display element.

In one case the system comprises means to enhance the resolution of the delivered stereoscopic images. Preferably the resolution enhancement means is located between the direction means and the output means. Ideally the resolution enhancement means is configured to be modulated simultaneously with the direction means. By simultaneously modulating, this arrangement enables the possibility of viewing more than one displaying content simultaneously from two different viewing angles. Most preferably the resolution enhancement means is transparent. The resolution enhancement means may be of a flexible material. The flexibility of the material minimises the displacement required to create the desired 3D effects. By minimising the amount of displacement, the energy required by a prime mover to move the flexible material is minimised. The energy required to displace the flexible material is directly proportional to the square of the displacement of the flexible material. In particular the energy required to displace the flexible material may be calculated from the following equation:

$$K.E.=\tfrac{1}{2}*(K*X^2)$$

where K.E.=the required kinetic energy,
K=the spring constant of the flexible material,
X=the actual displacement of the flexible material.

The resolution enhancement means may comprise a film. The film allows flexibility, and is durable, and results in a low power requirement to move the film. The resolution enhancement means may comprise a reservoir for receiving a fluid.

In another case the invention provides a computer implemented system.

The invention also provides in another aspect a computer program product comprising computer program code capable of causing a computer system to operate a system as described above when the computer program product is run on a computer system.

The computer program product may be embodied on a record medium. The computer program product may be embodied on a carrier signal. The computer program product may be embodied on a read-only memory.

BRIEF DESCRIPTION OF THE DRAWINGS

The invention will be more clearly understood from the following description of some embodiments thereof, given by way of example only, with reference to the accompanying drawings, in which.

DETAILED DESCRIPTION

Figure 1:
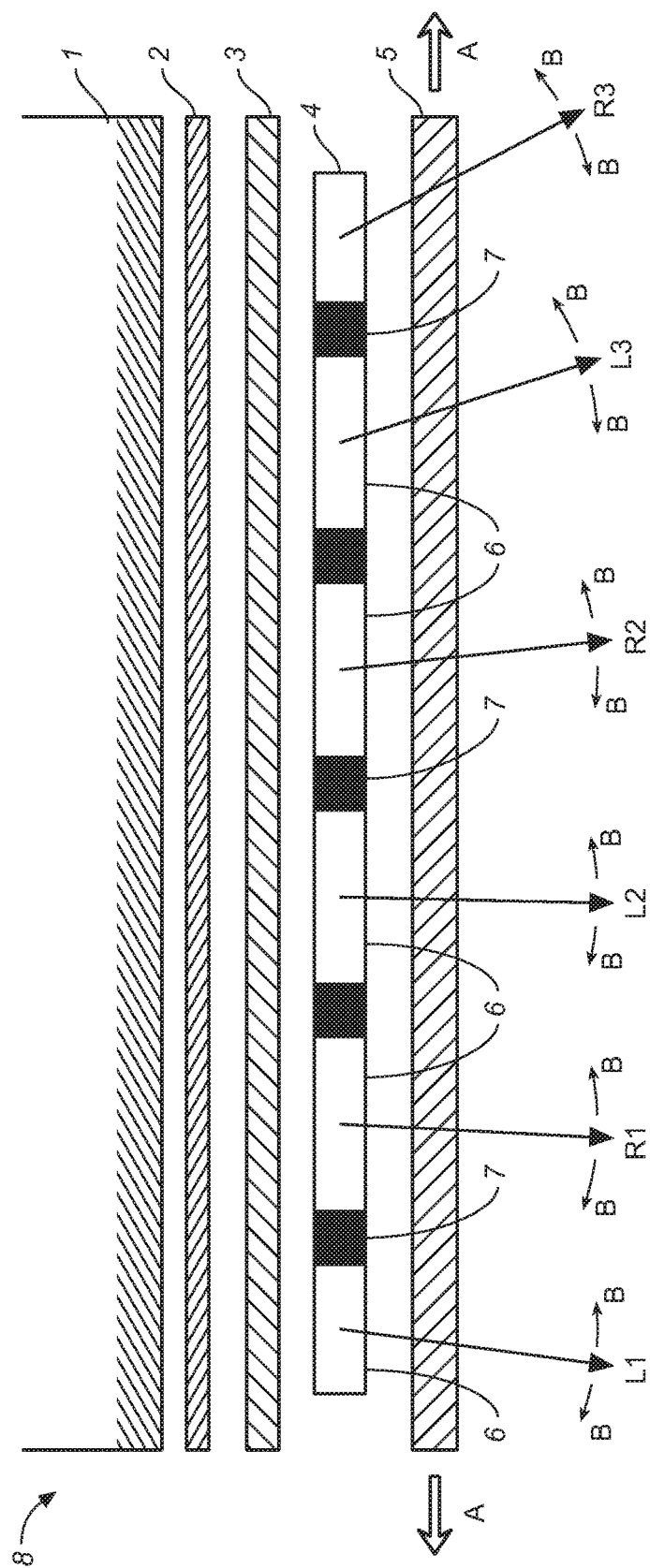
FIG. 1 is a schematic cross-sectional plan view of a system for delivering stereoscopic images according to the invention.
Figure 2:
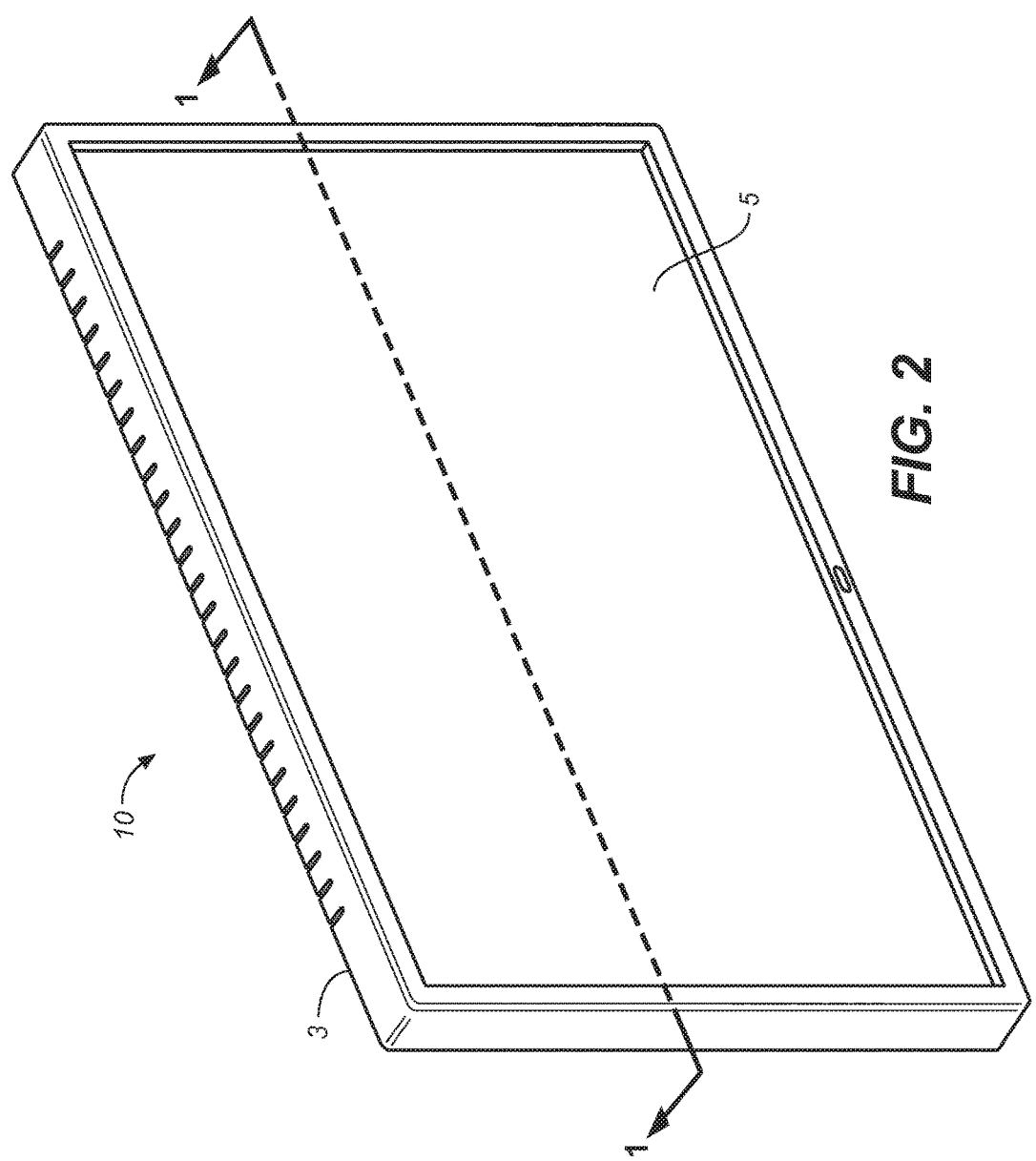
FIG. 2 is an isometric view of another system for delivering stereoscopic images according to the invention.

Referring to the drawings, and initially to FIG. 1 thereof, there is illustrated a computer implemented system 8 for delivering stereoscopic images according to the invention. The system 8 produces stereoscopic display for viewing by one or more viewers without 3-D glasses being required.

The system 8 comprises a video display element 1, an image direction element 4, a front holder element 5, a rear holder element 3, and a resolution enhancement element 2.

The video display element 1 outputs a first left-eye image L1, a first right-eye image R1, a second left-eye image L2, a second right-eye image R2, a third left-eye image L3, and a third right-eye image R3.

The image direction element 4 directs the first left-eye image L1 at a desired first left-eye angle, directs the first right-eye image R1 at a desired first right-eye angle, directs the second left-eye image L2 at a desired second left-eye angle, directs the second right-eye image R2 at a desired second right-eye angle, directs the third left-eye image L3 at a desired third left-eye angle, and directs the third right-eye image R3 at a desired third right-eye angle.

In this case the image direction element 4 comprises six transparent parts 6 and five non-transparent parts 7 coupled together. A transparent part 6 is provided corresponding to each left-eye image L1, L2, L3, and a transparent part 6 is provided corresponding to each right-eye image R1, R2, R3. A non-transparent part 7 is located between each pair of adjacent transparent parts 6.

In this case the image direction element 4 is provided in the form of a film of flexible material.

The front holder element 5 is coupled to the front side of the image direction element 4 to hold the front side of the image direction element 4, and the rear holder element 3 is coupled to the rear side of the image direction element 4 to hold the rear side of the image direction element 4. The front holder element 5 is movable relative to the video display element 1 in the directions of arrows A, and the rear holder element 3 is fixed relative to the video display element 1.

In this case the front holder element 5 is transparent, and the rear holder element 3 is transparent.

In this case the front holder element 5 is provided in the form of a rigid film, and the rear holder element 3 is provided in the form of a rigid film.

The image direction element 4 is laminated between the two transparent, relatively rigid films 5, 3.

The front holder element 5 is movable relative to the rear holder element 3 to move the image direction element 4. The image direction element 4 is movable to adjust the first left-eye angle at which the first left-eye image L1 is directed and to adjust the first right-eye angle at which the first right-eye image R1 is directed to suit a first viewer, to adjust the second left-eye angle at which the second left-eye image L2 is directed and to adjust the second right-eye angle at which the second right-eye image R2 is directed to suit a second viewer, to adjust the third left-eye angle at which the third left-eye image L3 is directed and to adjust the third right-eye angle at which the third right-eye image R3 is directed to suit a third viewer. Each left-eye image L1, L2, L3 is adjustable in the directions of arrows B. Similarly each right-eye image R1, R2, R3 is adjustable in the directions of arrows B. The invention enables the angles to be adjusted to suit the viewer using the flexible film 4.

The flexible film 4 enables light to pass through the film 4 at a specific limited range of angles. A plurality of viewers may therefore view a plurality of stereoscopic images. The specific limited range of angles may be adjusted to suit the viewers.

The film 4 acts as an occlusion element, is flexible and the angle is tunable to suit a viewer.

By displacing the rigid films 5, 3, different amounts of stress on the image direction element 4 may be created. This enables the angle of light passing through the image direction element 4 to be directed at a range of angles. In the case that the rigid film 3 on the back of the image direction element 4 is stationary, for example attached to the front surface of an LCD, CRT, plasma, or other type of display 1, and the layers 6, 7 of the image direction element 4 are aligned vertically, and the display images are synchronized to the angle of transmission through the image direction element 4, a stereoscopic image, or many image angles for multiple viewers may be produced.

The resolution enhancement element 2 is located between the image direction element 4 and the video display element 1. The resolution enhancement element 2 is modulated simultaneously with the image direction element 4. In this manner the resolution enhancement element 2 enhances the resolution of the delivered stereoscopic images.

In this case the resolution enhancement element 2 is transparent.

In this case the resolution enhancement element 2 is provided in the form of a thin film of flexible material.

The second flexible film 2 is included between the first flexible film 4 and the display 1. By modulating the two films 2, 4 simultaneously resolution limitations may be eliminated. Thus limitations of resolution of layers that make up the flexible tunable angle occlusion film 4 may be avoided using the second clear flexible film layer 2 between the back rigid film 3 and the display 1, and modulating both layers 2, 4 simultaneously against each other to change the viewing angle, and with each other to preserve the viewing angle but move the occluded lines. In particular the introduction of vertical lines or occluded lines at the same resolution is prevented. This allows the dynamic viewing angle film 4 to be resolution free, and not to be tied to the resolution of the underlying display 1.

The image direction element 4 may be formed in any suitable manner. For example a plurality of transparent first layer parts 6 and a plurality of non-transparent second layer parts 7 may be laminated together in an alternating manner. In particular the image direction element 4 may be made from hundreds or thousands of layers of alternating thin clear silicon sheets 6 and thin black silicon sheets 7 which are laminated, and then cut perpendicular to the layers 6, 7 into the thin film 4. The image direction element 4 allows light and images through only at limited angles parallel with the thin black sheet layers 7.

The system 8 may be operated under the control of a computer program product. The computer program product comprises computer program code capable of causing a computer system to operate the system 8 when the computer program product is run on the computer system. The computer program product may be embodied on a record medium, or a carrier signal, or a read-only memory.

In use, the video display element 1 outputs the first left-eye image L1, the first right-eye image R1, the second left-eye image L2, the second right-eye image R2, the third left-eye image L3, and the third right-eye image R3. The image direction element 4 directs the first left-eye image L1 at the desired first left-eye angle, directs the first right-eye image R1 at the desired first right-eye angle, directs the second left-eye image L2 at the desired second left-eye angle, directs the second right-eye image R2 at the desired second right-eye angle, directs the third left-eye image L3 at the desired third left-eye angle, and directs the third right-eye image R3 at the desired third right-eye angle. The system 8 produces a stereoscopic display without 3-D glasses being required.

The front holder element 5 may be moved in the directions of arrows A relative to the rear holder element 3 and the video display element 1 to move the image direction element 4. In this manner the first left-eye angle at which the first left-eye image L1 is directed is adjusted in the directions of arrows B and the first right-eye angle at which the first right-eye image R1 is directed is adjusted in the directions of arrows B to suit a first viewer, the second left-eye angle at which the second left-eye image L2 is directed is adjusted in the directions of arrows B and the second right-eye angle at which the second right-eye image R2 is directed is adjusted in the directions of arrows B to suit a second viewer, the third left-eye angle at which the third left-eye image L3 is directed is adjusted in the directions of arrows B and the third right-eye angle at which the third right-eye image R3 is directed is adjusted in the directions of arrows B to suit a third viewer. The system 8 uses the flexible film 4 to adjust the directions at which the images are directed.

The resolution enhancement element 2 is modulated simultaneously with the image direction element 4 to enhance the resolution of the delivered stereoscopic images.

In FIG. 1 the video display element 1 is illustrated as outputting three left-eye images, and outputting three right-eye images. However it will be appreciated that the video display element may output any number of left-eye images, and output any number of right-eye images. The system may supply 3D images to multiple viewers. The viewers are not required to wear special glasses.

The number of angle zones may be modified, for example two for a single viewer, four for two viewers, or many for a shared display. Each angle synchronized takes one more time slice from the total number of images to be displayed.

In FIG. 1 the image direction element 4 is illustrated as directing three left-eye images at desired left-eye angles, and directing three right-eye images at desired right-eye angles. However it will be appreciated that the image direction element may direct any number of left-eye images at a desired left-eye angle, and direct any number of right-eye images at a desired right-eye angle. The image direction element may be movable to adjust each left-eye angle at which each left-eye image is directed and to adjust each right-eye angle at which each right-eye image is directed to suit a plurality of viewers.

In FIG. 1 the image direction element 4 is illustrated as comprising six transparent parts 6 and five non-transparent parts 7. However it will be appreciated that the image direction element may comprise any number of transparent parts and any corresponding number of non-transparent parts.

It will be appreciated that in an alternative embodiment of the invention, the image direction element may comprise one or more micro lenses. In another embodiment micro lenses may be used on a movable layer. This would allow for lower overall resolution but if modulated in two directions, for example in a circle, a much higher apparent resolution may be achieved for any one point average over time. Visually this may appear as if the micro lenses were a flat surface rather than an array of bumps.

It will also be appreciated that in another alternative embodiment of the invention, the image direction element may comprise one or more liquid crystal cells. The image direction element 4 as described above with reference to FIG. 1 may be replaced by any dynamic angle occlusion film technology, liquid crystal cell based, or other physical material construction.

It will further be appreciated that in another alternative embodiment of the invention, the resolution enhancement element may comprise a reservoir for receiving a fluid. The fluid may be a liquid or a gas, such as air. In particular the clear layer 2 may be a transversely flexible material as described with reference to FIG. 1 above, or alternatively be an air gap, or a liquid gap, or alternatively be another optically transparent layer that separates the moving occlusion layer 4 from the imaging layer 1.

The invention is suitable for use in mobile gaming applications, and/or home theatre applications, and/or home entertainment system applications, and/or advertising display applications.

In FIGS. 2 to 7 there is illustrated another computer implemented system 10 for delivering stereoscopic images according to the invention, which is similar to the computer implemented system 8 of FIG. 1, and similar elements in FIGS. 2 to 7 are assigned the same reference numerals.

In this case the system 10 comprises a film control mechanism. The image direction element 4 is pre-tensioned to prevent wrinkles or warpage, and a feedback mechanism is used to control and maintain the desired viewing angle during film translation over the display 1. The movement is driven by a voltage controlled motor 12.

Figure 3:
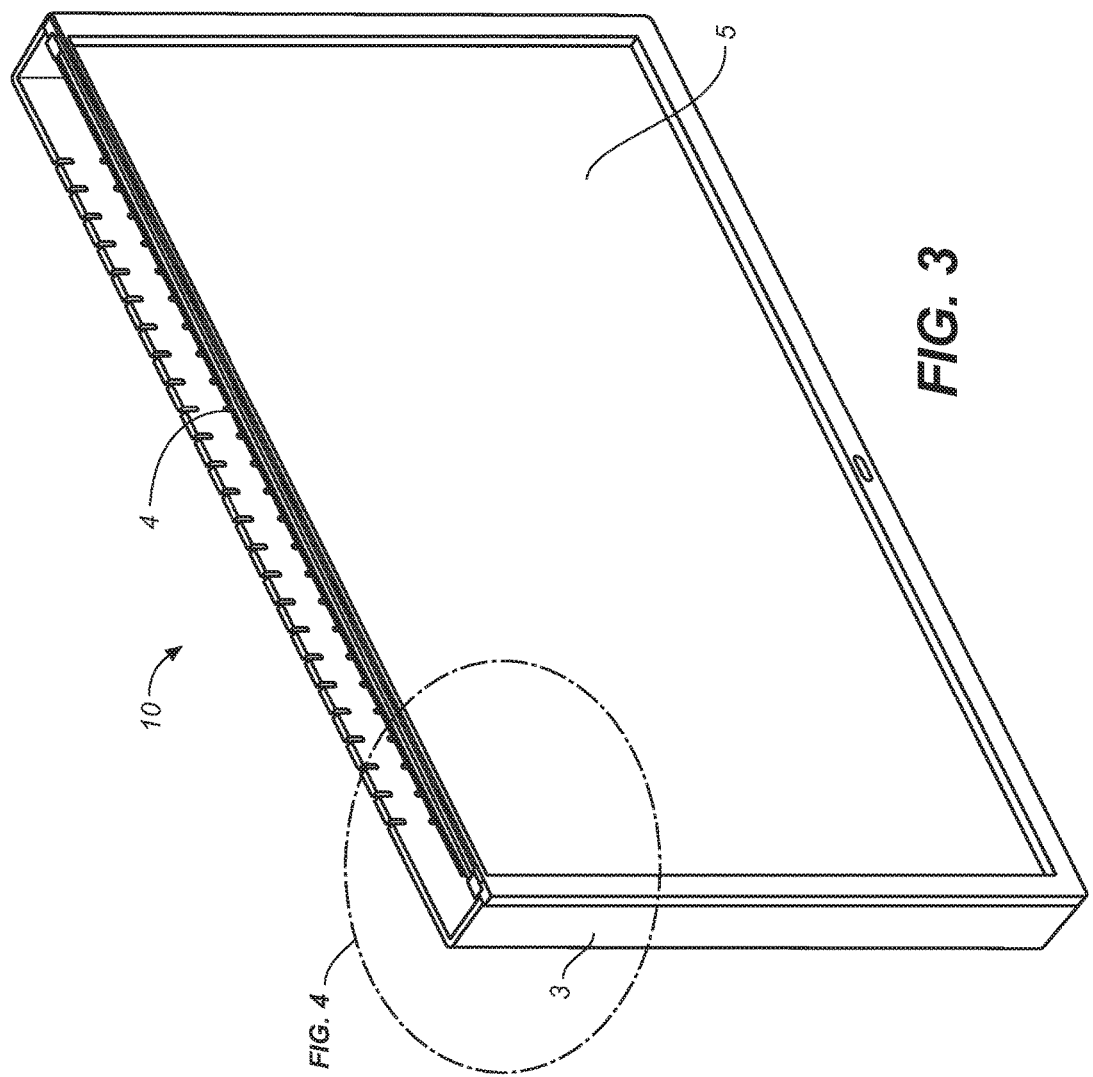
FIG. 3 is a cut-away isometric view of the system of FIG. 2.
Figure 4:
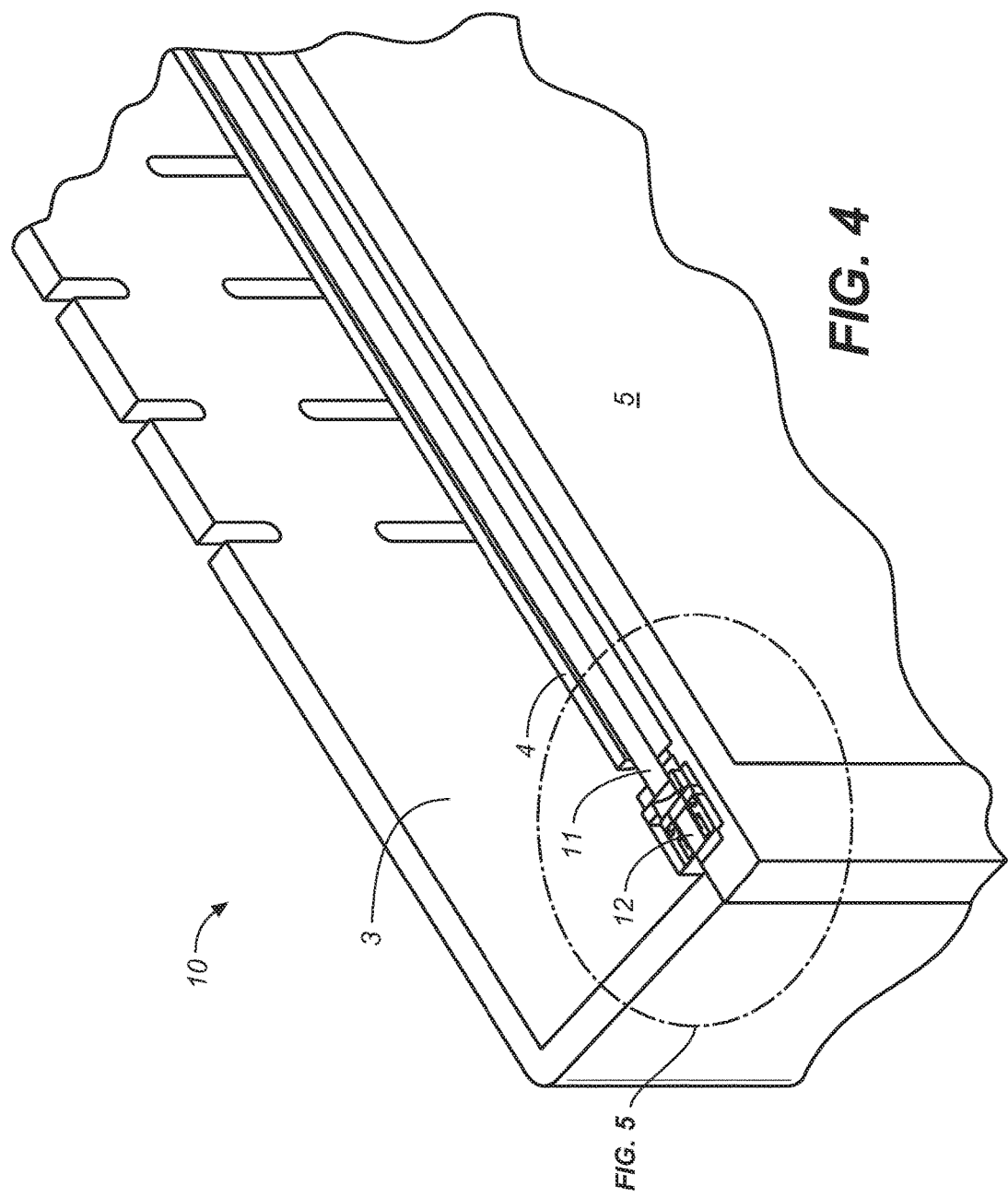
FIG. 4 is an enlarged cut-away isometric view of part of the system of FIG. 3.
Figure 5:
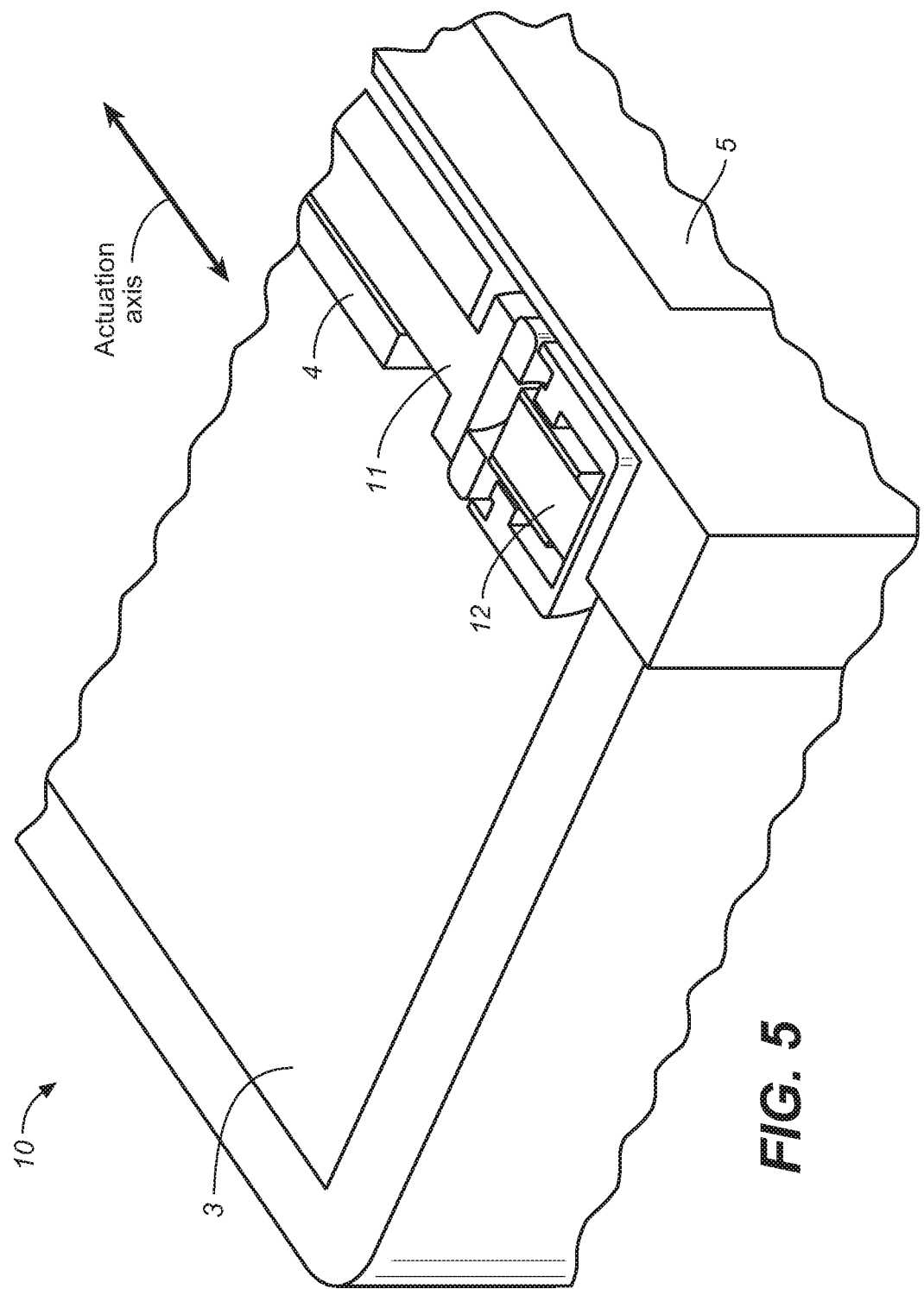
FIG. 5 is an enlarged cut-away isometric view of part of the system of FIG. 4.
Figure 6:
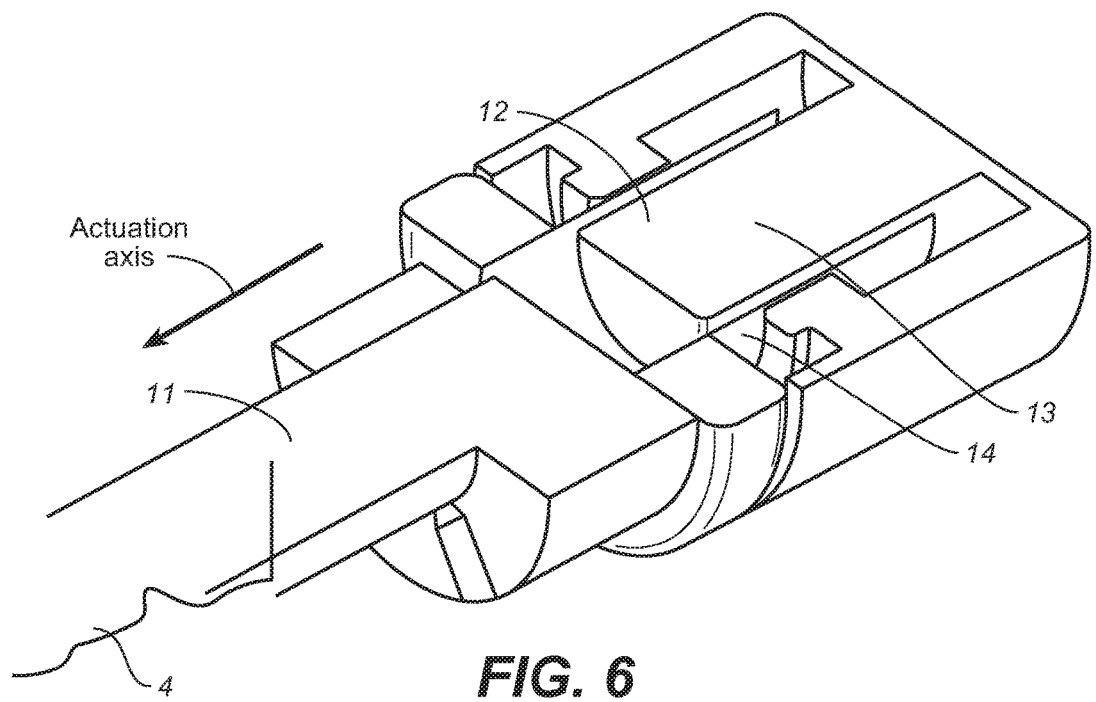
FIG. 6 is an enlarged cut-away isometric view of part of the system of FIG. 5.

FIG. 3 illustrates the rear panel 3, the LCD front surface 5, and the linearly actuated occlusion 4. FIG. 5 illustrates an actuation rod 11, the linear voltage controlled motor 12, and the linearly actuated occlusion 4. FIG. 6 illustrates the actuating rod 11, the pre-tensioned image direction element 4, a core 13 of the voltage controlled motor 12, and a coil 14 of the voltage controlled motor 12. The coil 14 may be provided with or without a bobbin.

Figure 7:
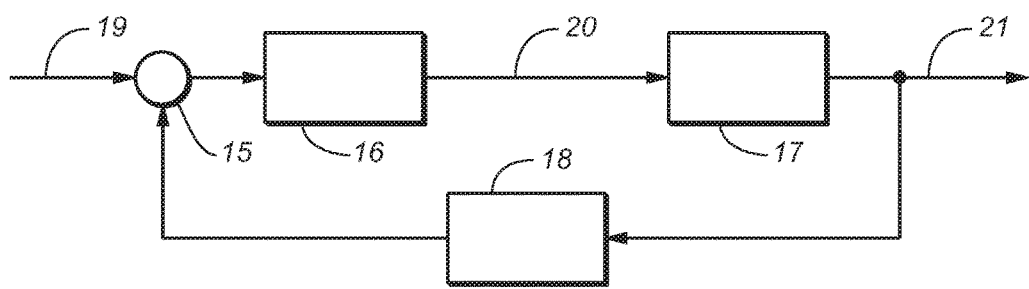
FIG. 7 is a flowchart illustrating a method of using the system of FIG. 2.

FIG. 7 illustrates a method of operating the linearly actuated occlusion 4. FIG. 7 illustrates an input command 19, a summation block 15, a PID controller 16, a control voltage 20, a voice coil motor 17, a position sensor 18, and a dynamic occlusion signal 21.

Figure 8:
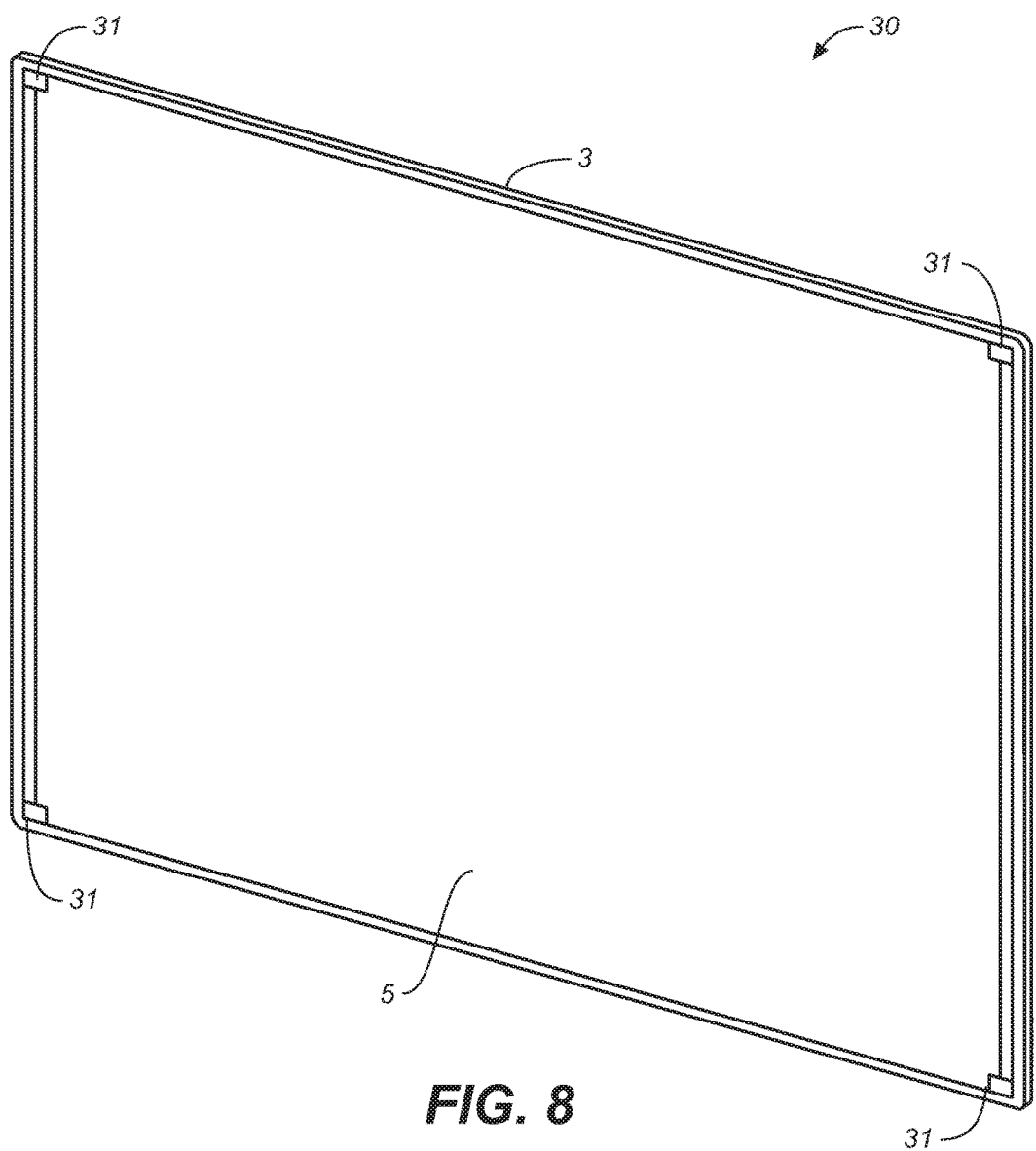
FIG. 8 is an isometric view of another system for delivering stereoscopic images according to the invention.

FIG. 8 illustrates a further computer implemented system 30 for delivering stereoscopic images according to the invention, which is similar to the computer implemented system 10 of FIGS. 2 to 7, and similar elements in FIG. 8 are assigned the same reference numerals.

In this case the system 30 comprises a plurality of head and/or eye tracking elements 31 to determine the location of a viewer. The image direction element 4 is moved responsive to the head and/or eye tracking elements 31 determining the location of the viewer. FIG. 8 illustrates the four actuator/position sensors 31 for use with the linearly actuated occlusion 4.

The flexible film 4 enables light to pass through the film 4 at a specific limited range of angles. A plurality of viewers may therefore view a plurality of stereoscopic images. The specific limited range of angles may be adjusted to suit the viewer using the head or eye tracking devices 31.

The chosen viewing angles may be adjusted to match individual viewers using the head or eye tracking system. This enables much tighter viewing angles to be used.

The system 30 enables multiple content to be simultaneously projected to different viewers, for example to adults and children. In the case where the viewers use headphone audio, different movies may be simultaneously watched on the same display 1. In the case where a face recognition system is employed, or pre-programmed based on viewing direction, a single display 1 may simultaneously project multiple content to different viewers. A use for this is that adult content may be safely watched by children who would receive appropriate images, for example cartoon or blood free or clothed versions, where a parent may watch a full uncensored version at the same time. With headphone audio, different movies may be watched simultaneously on a single display.

The invention provides a resolution free dynamic occlusion film 4 with head tracking for glasses free stereoscopic displays.

Figure 9:
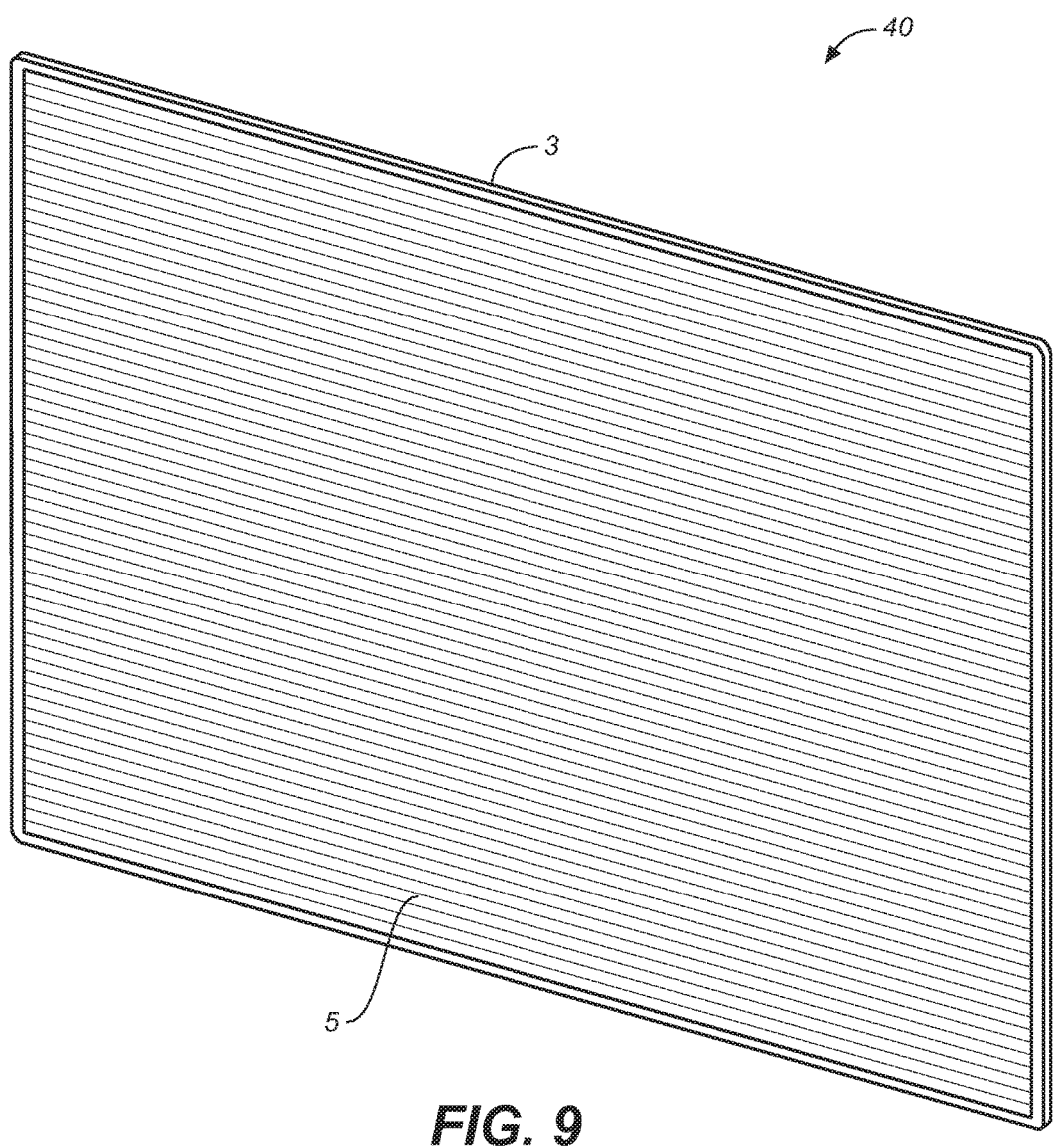
FIG. 9 is an isometric view of another system for delivering stereoscopic images according to the invention.
Figure 10:
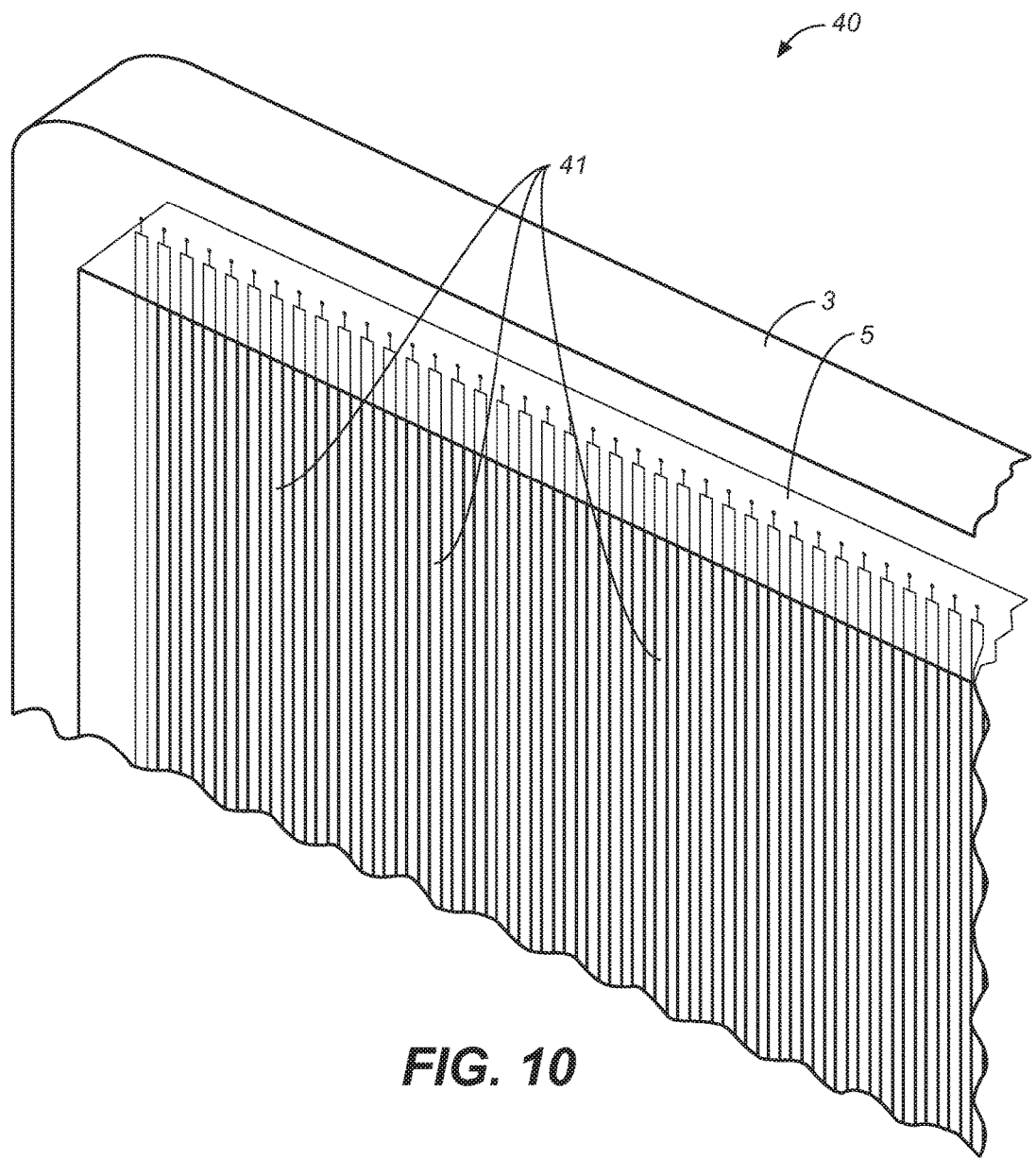
FIG. 10 is an enlarged isometric view of part of the system of FIG. 9.

Referring to FIGS. 9 and 10 there is illustrated another computer implemented system 40 for delivering stereoscopic images according to the invention, which is similar to the computer implemented system 10 of FIGS. 2 to 7, and similar elements in FIGS. 9 and 10 are assigned the same reference numerals.

In this case the image direction element 4 comprises rotating rods or slats 41. The rotating rods/slats 41 are miniaturized and motorized. The rotating rods/slats 41 may comprise lenses and occlusion material rather than printed surfaces. FIG. 10 illustrates the rotary vertical occlusion.

The rod and shaft assembly illustrated in FIGS. 9 and 10 comprises precision voice coil technology. This arrangement is reliable and cost effective.

The embodiments of the invention described previously with reference to the accompanying drawings comprise a computer system and/or processes performed by the computer system. However the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, such as a CD-ROM, or magnetic recording medium, such as a floppy disk or hard disk. The carrier may be an electrical or optical signal which may be transmitted via an electrical or an optical cable or by radio or other means.

The invention is not limited to the embodiments hereinbefore described, with reference to the accompanying drawings, which may be varied in construction and detail.

What is claimed is:

1. A system for delivering stereoscopic images comprising:
    an image display for outputting at least a first left-eye image and at least a first right-eye image,
    an image direction element, separate from the image display, configured to make kinetic motions responsive to a tracked location related to a viewer and direct the first left-eye image at a desired first left-eye angle and to direct the first right-eye image at a desired first right-eye angle,
    the image direction element being movable relative to the image display to adjust the first left-eye angle at which the first left-eye image is directed and to adjust the first right-eye angle at which the first right-eye image is directed to suit the viewer,
    wherein the image direction element comprises a flexible film and both the first left-eye angle and the first right-eye angle are adjusted by deforming the flexible film.

2. A system as claimed in claim 1 wherein the image direction element comprises a plurality of first layer parts and a plurality of second layer parts coupled together.

3. A system as claimed in claim 2 wherein the plurality of first layer parts are coupled to the plurality of second layer parts in an alternating manner.

4. A system as claimed in claim 2 wherein each first layer part is transparent.

5. A system as claimed in claim 2 wherein each second layer part is non-transparent.

6. A system as claimed in claim 1 wherein the system comprises a holding element to hold the image direction element.

7. A system as claimed in claim 6 wherein the holding element comprises a first holder element to hold a first side of the image direction element and a second holder element to hold a second side of the image direction element.

8. A system as claimed in claim 6 wherein the holding element is transparent.

9. A system as claimed in claim 1 wherein the system comprises an element to determine the location of a viewer.

10. A system as claimed in claim 9 wherein the image direction element is configured to move responsive to the location determining element determining the location of a viewer.

11. A system as claimed in claim 1 wherein the system comprises an element to enhance the resolution of the delivered stereoscopic images.

12. A system as claimed in claim 11 wherein the resolution enhancement element is located between the image direction element and the image display.

13. A system as claimed in claim 11 wherein the resolution enhancement element is configured to be modulated simultaneously with the image direction element.

14. A method for delivering stereoscopic images, the method comprising:
- outputting, by an image display, at least a first left-eye image and at least a first right-eye image;
- directing, by an image direction element separate from the image display, the first left-eye image at a desired first left-eye angle;
- directing, by the image direction element, the first right-eye image at a desired first right-eye angle;
- wherein the image direction element is configured to make kinetic motions responsive to a tracked position related to a viewer;
- wherein the image direction element is movable relative to the image display to adjust the first left-eye angle at which the first left-eye image is directed and to adjust the first right-eye angle at which the first right-eye image is directed to suit the viewer; and
- deforming a flexible film to adjust thereby the first left-eye angle at which the first left-eye image is directed and the first right-eye angle at which the first right-eye image is directed to suit the viewer.

15. A method as claimed in claim 14, wherein the image direction element is held by a holding element.

16. A method as claimed in claim 14, wherein the location of a viewer is determined with a location determining element.

17. A method as claimed in claim 14, wherein the resolution of the delivered stereoscopic images is enhanced by an image resolution element.

18. A non-transitory computer-readable storage medium having stored thereon computer-executable instructions which, when executed by one or more computing processors, cause the one or more computing processors to perform:
- outputting, by an image display, at least a first left-eye image and at least a first right-eye image;
- directing, by an image direction element separate from the image display, the first left-eye image at a desired first left-eye angle;
- directing, by the image direction element, the first right-eye image at a desired first right-eye angle;
- wherein the image direction element is configured to make kinetic motions responsive to a tracked position related to a viewer;
- wherein the image direction element is movable relative to the image display to adjust the first left-eye angle at which the first left-eye image is directed and to adjust the first right-eye angle at which the first right-eye image is directed to suit the viewer; and
- deforming a flexible film to adjust thereby the first left-eye angle at which the first left-eye image is directed and the first right-eye angle at which the first right-eye image is directed to suit the viewer.

19. A medium as claimed in claim 18, wherein the image direction element is held by a holding element.

20. A medium as claimed in claim 18, wherein the location of a viewer is determined with a location determining element.

21. A medium as claimed in claim 18, wherein the resolution of the delivered stereoscopic images is enhanced by an image resolution element.

* * * * *